T. MILLER.
Ale or Beer Measures.
No. 200,744. Patented Feb. 26, 1878.
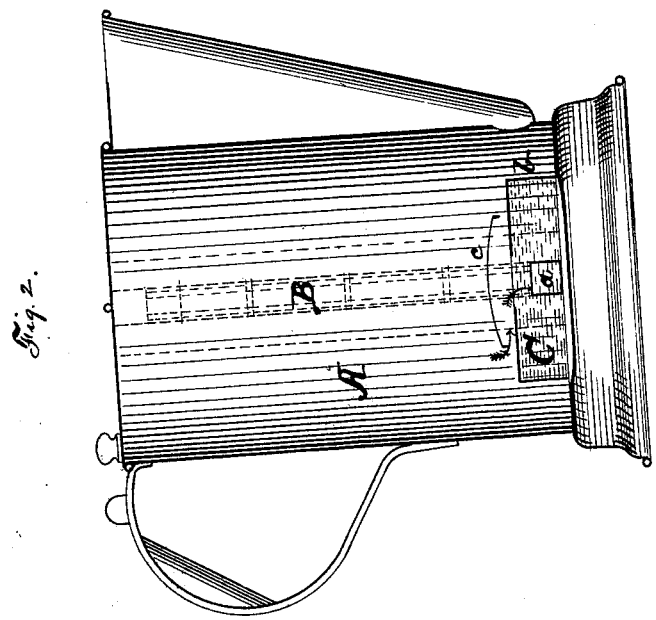
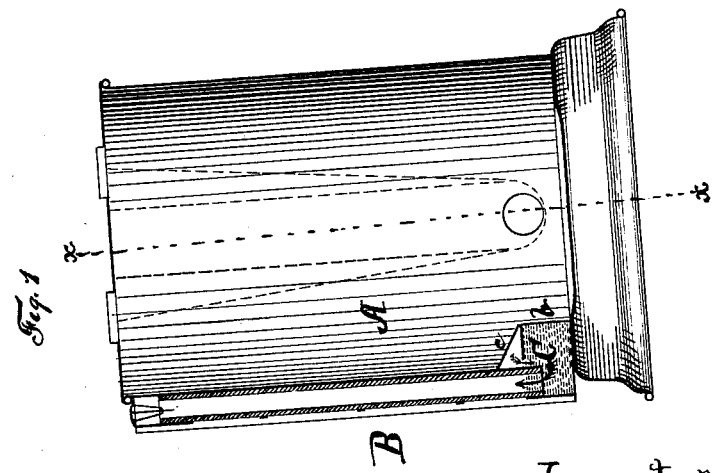
Witnesses
William H. Lewis
H H Doubleday
Inventor
Thomas Miller
by Cochrane & Malcomson
his Attorneys
N. PETERS, PHOTO-LITHOGRAPHER, WASHINGTON, D. C.

UNITED STATES PATENT OFFICE.

THOMAS MILLER, OF JERSEY CITY, NEW JERSEY.

IMPROVEMENT IN ALE OR BEER MEASURES.

Specification forming part of Letters Patent No. 200,744, dated February 26, 1878; application filed July 9, 1877.

*To all whom it may concern:*

Be it known that I, THOMAS MILLER, of Jersey City, in the State of New Jersey, have made certain new and useful Improvements in Ale or Beer Measures not before known or used; and I hereby declare the following specification to be a full and clear description of said improvements, reference being had to the annexed drawing and letters of reference marked thereon.

In the drawing, Figure 1 is a vertical cross-section of my improved measure, and Fig. 2 is also a vertical section through the same on the line $x\ x$ of Fig. 1.

The object of my invention is to provide a ready and convenient means of ascertaining the quantity of liquor in the measure, including that portion which is contained in the form of froth or foam; and in order to accomplish this object I cover or inclose the outlet from the interior of the measure to the measuring-tube, by soldering strips of metal to the side and bottom of the measure at the point where the tube connects therewith, so as to form a separate compartment at the base of such tube on the inside of the measure above the bottom, which compartment has small apertures leading into it, arranged so that the foam or froth will not be driven against or through them into this compartment when the liquor is drawn or poured into the measure, all of which will more clearly appear by the drawings and description of the different parts.

In the drawings, A represents the body of the measure, and B is a glass tube, placed in the usual manner on the outside thereof, provided with proper marks to indicate the quantity of liquor contained in the measure, and connecting with the interior thereof by an inlet, $a$, through the side just above the bottom.

On the interior of the measure I cover the inlet $a$, or close it in by strips of metal $b$ and $c$, which are soldered to the bottom and sides of the measure, so as to form a compartment or space, C, partially separated from the rest of the interior of the measure, but within it, and above the bottom.

The strip $c$ is placed on an incline from the side of the measure to the edge or top of the partition $b$, and forms a dasher or shield, on which the beer or ale may strike on being drawn into the measure; but it is not joined closely to the partition $b$, in order that small apertures may be left, through which the liquor in the measure will flow when it reaches the level of the top of the partition or strip $b$, as indicated by the arrows in Fig. 2, while the froth or foam, by reason of its lightness, will not enter the compartment C, but remain in the body of the measure.

As the quantity of ale or beer in the measure increases it will be indicated by a corresponding rise in the tube B, there being the usual free communication between the measure and the tube for a liquid; but the tube is kept free from froth or foam by reason of its inlet from the interior of the measure being protected by the interposition of the compartment C.

When the measure is emptied, the ale or beer will pass out of the tube and compartment C, leaving them almost entirely empty, and if any should remain it may be easily drained out, as the upper end of the tube B is open, and provided with a removable cover or cap, through which there is also a small aperture made for the free passage of air.

I claim—

The combination of the strips or partitions $b$ and $c$ with the sides and bottom of an ale or beer measure, so as to form a compartment surrounding the outlet to the measuring-tube B, substantially as and for the purpose shown and described.

THOMAS MILLER.

Witnesses:
A. BELL MALCOMSON, Jr.,
JOHN COCHRANE.